United States Patent [19]

Groetzinger

[11] Patent Number: 4,529,428
[45] Date of Patent: Jul. 16, 1985

[54] METHOD AND APPARATUS FOR FEEDING AN ABLATION LIQUEFACTION PROCESS

[75] Inventor: John K. Groetzinger, Cumberland, Md.

[73] Assignee: PPG Industries, Inc., Pittsburgh, Pa.

[21] Appl. No.: 555,244

[22] Filed: Nov. 25, 1983

[51] Int. Cl.³ .............................................. C03B 5/14
[52] U.S. Cl. ........................................ 65/27; 65/135;
    65/335; 75/65 R; 266/213; 432/264
[58] Field of Search ................. 65/27, 134, 135, 335;
    75/20 R, 43, 65 R; 266/213; 432/264

[56] References Cited

U.S. PATENT DOCUMENTS 1,953,023  3/1934  Mulholland .......................... 65/135
2,834,157  5/1958  Bowes .
4,308,019  5/1982  Dejaiffe et al. ..................... 65/27 X
4,381,934  5/1983  Kunkle et al. ........................ 65/135
4,385,918  5/1983  Dunn et al. .............................. 65/27

FOREIGN PATENT DOCUMENTS 486447  11/1929  Fed. Rep. of Germany ........ 65/335

Primary Examiner—Robert Lindsay
Attorney, Agent, or Firm—Dennis G. Millman

[57] ABSTRACT

In a method and apparatus for melting pulverulent material such as glass batch wherein liquefaction takes place on a stable layer of pulverulent material, adjustable means are provided for feeding the material in a controlled manner onto the active melting surface.

13 Claims, 4 Drawing Figures

METHOD AND APPARATUS FOR FEEDING AN ABLATION LIQUEFACTION PROCESS

BACKGROUND OF THE INVENTION

The present invention relates to controlling conditions within a chamber for converting pulverulent raw materials to a liquefied state as a first step in a melting process. The invention is generally applicable to processes that involve thermally converting a generally flowable, essentially solid state feed material to a molten fluid. The invention is particularly applicable to melting a transient layer of the material supported by a stable layer of granular, thermally insulating, non-contaminating material, e.g., liquefying a layer of glass batch supported by a layer of material such as a granular batch consistuent or glass batch.

U.S. Pat. No. 4,381,934 to Kunkle et al. teaches a method of converting particulate batch materials to a partially melted, liquefied state on a support surface of batch material within a melting chamber. As taught therein, the initial process of liquefying batch material is isolated from the remainder of the melting process and is carried out in a manner uniquely suited to the needs of the particular step, thereby permitting the liquefaction step to be carried out with considerable economies in energy consumption and equipment size and cost. In addition, because thermal energy input is used to perform only the particular liquefaction step, the relationship between this input and other operating parameters is more direct and generally less complex than in a conventional tank-type melting furnace.

In a preferred embodiment of the Kunkle invention, a drum portion of the melting chamber is mounted for rotation so that batch fed into the chamber is held against chamber side walls by rotation of the drum to maintain a stable layer along the interior of the drum. Thermal energy is supplied to the drum interior so that the batch layer encircles the heat source. The liquefaction process is carried out by feeding batch into the drum through a stationary lid while rotating the drum and supplying heat to the drum interior to melt incoming batch material in a transient layer while an underlying layer of batch remains substantially stable and unmelted. As the material is liquefied, it flows downward toward an exit end of the rotating drum.

Central to the Kunkle method is the concept of employing a noncontaminating, thermally insulating layer of granular material (e.g., glass batch itself) as the support surface upon which liquefaction of glass batch takes place. A steady state condition may be maintained in the liquefaction chamber by distributing fresh batch onto a previously deposited batch surface at essentially the same rate at which the batch is melting, whereby a substantially stable batch layer will be maintained beneath a transient batch layer, and liquefaction is essentially confined to the transient layer. The partially melted batch of the transient layer runs off the surface while contacting substantially only a batch surface, thus avoiding contaminating contact with refractories. Because glass batch is a good heat insulator, providing the stable batch layer with sufficient thickness protects any underlying support structure from thermal deterioration.

It would be advantageous to provide facilities for adjusting operating parameters such as batch input location in response to changing conditions within the melter.

SUMMARY OF THE INVENTION

The present invention relates to a method of and apparatus for determining conditions within a melting chamber of the type which utilizes a stable layer of granular, thermally insulating material, e.g., glass batch material, for supporting a transient layer of melting batch material during liquefaction of the material. Although not limited thereto, the invention is advantageously practiced for controlling an ablation liquefaction process in which the stable batch layer encircles a radiant heat source.

The invention relates to a method of and apparatus for controlling batch feeding facilities in a process of batch liquefaction in which batch material is fed to the chamber at its entrance end to provide a transient layer of molten batch material supported by and flowing over a stable layer toward an exit end of the chamber. The invention includes facilities for adjusting the location at which batch material enters the chamber in response to changes in location of the interior boundary of the stable layer.

THE DRAWINGS

DETAILED DESCRIPTION OF THE INVENTION

The preferred embodiment of the present invention relates to an ablation liquefaction process such as that taught in U.S. Pat. No. 4,381,934 to Kunkle et al., the teachings of which are hereby incorporated by reference.

For purposes of illustration the invention will be described as practiced with a rotary melter for liquefying glass batch material similar to that disclosed in U.S. patent application Ser. No. 481,970, filed on Apr. 4, 1983, to Kunkle et al., the teachings of which are hereby incorporated by reference. Other processes in which the invention is applicable may include metallurgical smelting-type operations and fusing of single or multiple component ceramics, metals or other materials. However, for the purposes of illustration, the present invention will be described as related to methods for melting glass, e.g., flat glass, container glass, fiber glass or sodium silicate glass, and in particular, to the first stage of melting, i.e., rendering batch materials to a liquefied state.

Figure 1:
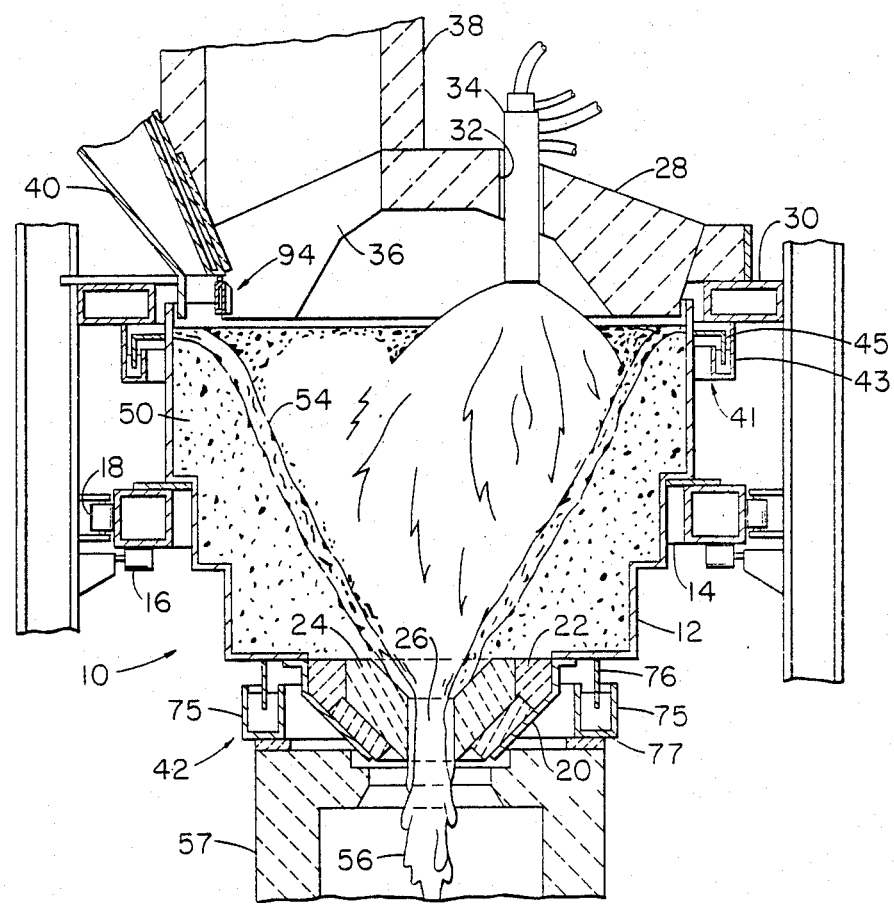
FIG. 1 is a cross-sectional view of a preferred embodiment of melting vessel in which the batch feeding means of the present invention is incorporated.

With reference to FIG. 1, the melter may include a steel drum 12 having stepped sidewalls so as to decrease the amount of mass being rotated. The drum 12 is supported on a circular frame 14 which is, in turn, mounted for rotation about a generally vertical axis, corresponding to the centerline or axis of symmetry of the drum, on a plurality of support rollers 16 and aligning rollers 18. A bottom section 20 may be detachably secured to the drum 12. The bottom section 20 may be lined with an annulus of refractory material 22 such as castable refractory cement in which is seated a ring-like bushing 24 of an erosion resistant refractory material. The bushing 24 may be comprised of a plurality of cut pieces of ceramic. An open center 26 in the bushing 24 comprises the outlet opening from the liquefaction chamber. An upwardly domed refractory lid 28 is provided with stationary support by way of a surrounding frame member 30. The lid includes opening 32 for inserting primary burner 34. Optionally, an auxiliary burner may be provided directed narrowly toward the outlet region for controlling temperature and pressure in that region. The exhaust gases escape outwardly through an opening 36 through the lid 28 and into an exhaust duct 38. The opening 36 may also be utilized for feeding the raw materials to the liquefaction chamber, and, as shown in FIG. 1, a feed chute 40 is provided for this purpose.

To isolate the interior of the liquefaction chamber from the exterior ambient conditions and to trap any dust or vapors that may escape from the vessel, upper and lower water seals 41 and 42 respectively are provided. The upper seal comprises a trough 43 affixed to the frame 30 and a flange 45 attached to the drum 12 and having a downwardly extending portion immersed in a liquid (e.g., water) contained in the trough 43. The lower seal similarly includes a trough 75 and flange 76 immersed in liquid 77.

As shown, a stable layer of batch material 50 lines the interior of the drum 12. Before the melter 10 is heated, the stable layer of batch material 50 is provided in the melter by feeding loose batch through the feed chute 40 while the housing is rotated. The loose batch assumes a generally parabolic contour as shown in FIG. 1. The batch material may be wetted, e.g., with water, during the initial stage of forming the stable layer to facilitate cohesion of the layer along the sidewalls.

During the melting process, continuous feeding of batch to the melter 10 results in a falling stream of batch that becomes distributed over the surface of the stable batch layer 50, and by the action of the heat, e.g., from the primary burner 34 and the auxiliary burner 35, becomes liquefied in a transient layer 54 that runs to the bottom of the vessel and passes through the open center 26. The liquefied batch 56 falls from the exit opening and may be collected in a collection vessel 57 for further processing. With this arrangement, high thermal efficiency is provided by encircling the heat source with the batch material being melted, and the transient batch layer 54 being melted is distributed within the vessel by means of its rotation. Thus, the material initially remains exposed to the heat until it becomes liquefied, whereupon it flows out of the liquefaction zone.

Combinations of properties analogous to those in the liquefaction of glass batch may be found in the fusing of ceramic materials and the like and in metallurgical smelting-type operations. As will be appreciated, the invention is not limited to the melting of glass batch materials. Whatever the material to be liquefied, the invention may be advantageously practiced for control of a liquefaction process carried out with a transient layer of batch material supported by a stable layer of granular, preferably non-contaminating material. The preferred stable granular layer provides thermal insulation as well as a non-contaminating contact surface for the transient batch layer, and most preferably the stable layer includes one or more constituents of the batch material. It is desirable for the thermal conductivity of the material employed as the stable layer to be relatively low so that practical thicknesses of the layer may be employed while avoiding the need for wasteful forced cooling of the vessel exterior. In general, granular or pulverulent mineral source raw materials provide good thermal insulation, but in some cases it may be possible to use an intermediate or product of the melting process as a noncontaminating stable layer. For example, in a glassmaking process, pulverized cullet (scrap glass) could constitute the stable layer, although a thicker layer would be required due to the higher thermal conductivity of glass as compared to glass batch. In metallurgical processes, on the other hand, using a metallic product as the stable layer would entail unduly large thicknesses to provide thermal protection to the vessel, but some ore materials may be satisfactory as insulating layers.

Process parameters should be controlled to maintain desired steady state conditions within the melter, e.g., desired batch wall thickness. For this reason, the thickness of the batch wall may be monitored during the melting process. It has been found that temperatures along the top of the batch wall provide a good indication of the location of the batch wall boundary within the drum 12, and further, that the boundary of the batch wall at the top of the drum is a good indication of batch wall thickness throughout the drum. Thus, a preferred arrangement for monitoring the batch wall thickness is a plurality of thermocouples (not shown) inserted through holes in the lid 28 facing the upper end of the batch wall. This technique for determining the melting surface location is the subject matter of co-pending, commonly assigned, U.S. patent application Ser. No. 555,243 entitled "Method and Apparatus for Controlling Wall Layer Thickness in a Liquefaction Process" filed by Robert B. Heithoff on Nov. 25, 1983, the disclosure of which is hereby incorporated by reference.

It has been found that the radial location at which the batch material enters the melter relative to the boundary of the batch layer is important to melter operation. For example, if batch falls into the melter toward the center of the drum beyond the top of the transient layer 54, some batch may fall onto the batch wall too low within the drum to be liquefied before it reaches the exit opening 26. Also, if the batch is fed too close to the center of the drum, some of the batch may become entrained by the burner gases and may escape from the melter through the exhaust duct 38. Furthermore, in these cases the absence of fresh batch, and hence the absence of a transient layer deposited on the upper portion of the stable layer 50, may result in melting away this top portion of the stable layer causing a loss in thermal insulation along the top portion of the drum 12. On the other hand, if batch material enters the melter outside the transient layer 54, onto the upper edge of the stable batch layer 50, the deposited material undesirably inhibits the flow of additional batch into the melter, and some batch may exit from the melter at the interface between the lid 28 and the drum 12. Thus, the amount of pulverulent batch material falling, adhering to, and replenishing the stable layer is not well controlled in this situation. Another unstable batch material situation can occur if batch material accumulates at the top of the transient layer 54 in the manner of a ledge, and the accumulated batch precipitously falls through the drum to the outlet without being liquefied. To control the location at which fresh batch enters the melter drum 12, the invention provides an adjustable batch feeding arrangement.

Figure 2:
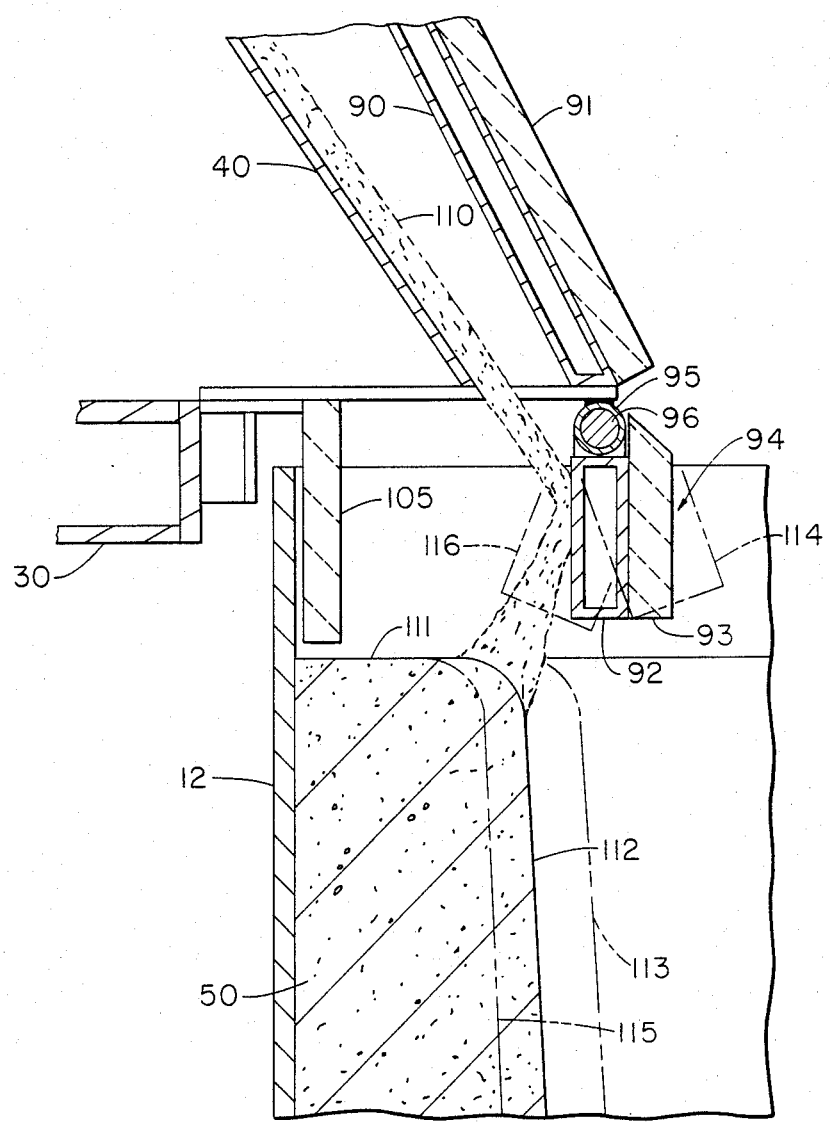
FIG. 2 is an enlarged cross-sectional view of the batch inlet portion of the melting vessel of FIG. 1, showing details of a batch guiding arrangement in accordance with the present invention.
Figure 3:
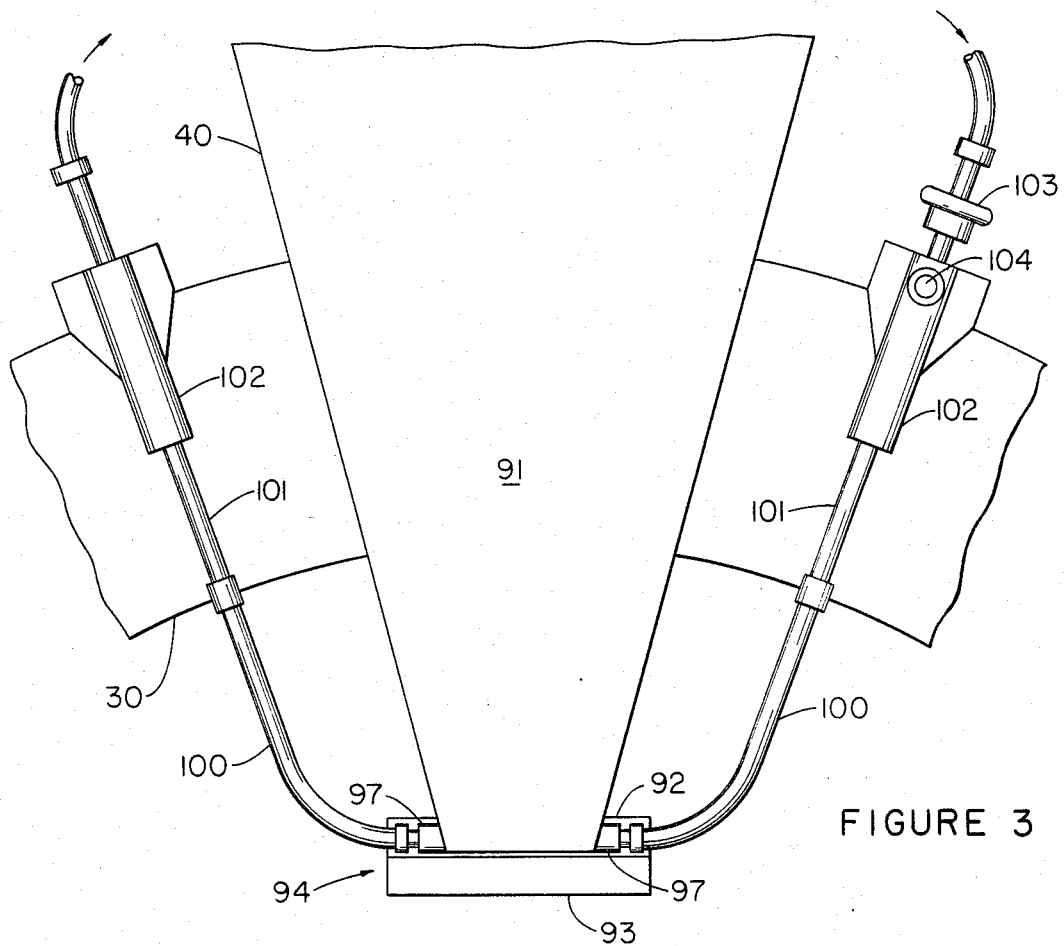
FIG. 3 is a plan view of the batch inlet portion of the embodiment of FIGS. 1 and 2.
Figure 4:
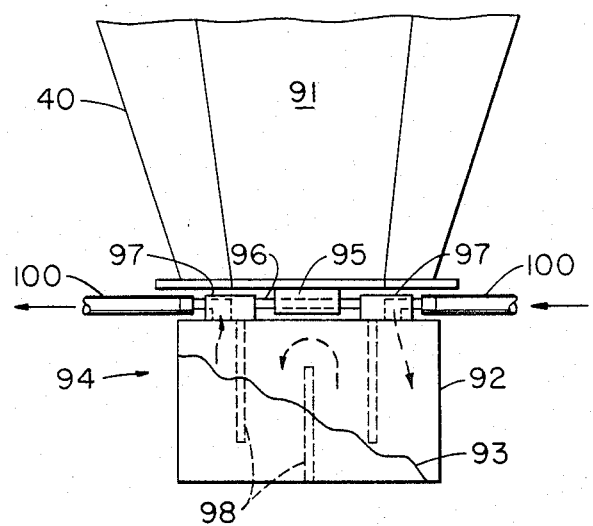
FIG. 4 is a front view of the batch feed chute and deflector of the embodiment of FIGS. 1-3.

With reference to FIGS. 2-4, the batch feeding arrangement includes the chute 40 which may be provided on its front (i.e., the side facing the heat source and the exhaust gas stream) with a water-cooled shield 90, which in turn may be protected by a ceramic refractory plate 91. Pivotably attached to the front bottom end of the chute is a deflector 94. The deflector 94 may be comprised of a plate 92 provided with internal passages for cooling fluid, and a front plate 93 of ceramic refractory. Tubular bearing member 95 is affixed to the front end of the chute 40 and pivotably receives a hinge pin 96 on which the deflector is carried. Couplings 97 are affixed to the top of the deflector and provide communication between the coolant passages within the deflector and the coolant supply and drain conduits. A typical water circulation pattern provided by internal baffles 98 is shown in FIG. 4. Rotation of the deflector may be provided by any suitable crank rod extending to the exterior of the melter, but a preferred arrangement is shown in the drawings wherein the coolant supply means serves as the rotational means as well. The coolant conduits comprise flexible tubing sections 100 which are sheathed with braided stainless steel wire. The flexible sections 100 are connected at one end to the couplings 97 and at the other end to a rigid conduit section 101 as shown in FIG. 3. Each rigid conduit section 101 is received in a sleeve 102 mounted on an exterior structural member such as frame member 30. The conduit 101 is free to rotate in the sleeve 102, and the rotation is transmitted through the flexible tubing 100 to the deflector. A wheel 103 may be provided on a least one of the conduits 101 for manual rotation of the conduit. A set screw with a knurled knob 104 may be provided in at least one of the sleeves 102 to prevent rotation of the conduit, and thus to lock the deflector in place once the desired orientation is selected.

As shown in FIG. 2, a refractory plate 105 may be supported in the opening 36 above the elevation of the batch layer to shield the exposed upper rim portion of the drum 12 from the heat and batch material within the melter.

Referring to FIG. 2, a stream 110 of pulverulent batch materials is directed into the melter by chute 40. The batch material in the melter may be characterized as having a top surface 111 and a sloped face 112, the latter being actively involved in the melting process. The deflector 94 diverts the batch stream 110 away from the central cavity of the melter and onto the actively melting face 112, preferably near the upper end of the face 112. Should the batch lining thicken so that the actively melting face changes to position 113 shown in phantom, the batch stream would be deposited onto the top surface 111, where it would detrimentally accumulate and be propelled into the cavity by contact with the lid 28. Therefore, when the batch face assumes position 113, the deflector 94 may be pivoted to position 114 shown in phantom so as to direct the stream onto the face of the batch layer. If the thickness of the batch layer becomes smaller so that the face assumes position 115 shown in phantom, the deflector 94 may be pivoted to position 116 shown in phantom so as to prevent the batch stream from by-passing the upper portion of the batch face.

The above embodiments of the invention were presented to illustrate features of the invention and are not limiting thereto, the scope of the invention being defined by the claims which follow.

I claim:

1. Apparatus for liquefying pulverulent material comprising: a generally cylindrical vessel mounted for rotation about a substantially vertical axis and having an interior side wall, means for heating the interior of the vessel to a liquefying temperature, outlet means at a bottom portion of the vessel for draining liquefied material from the vessel, a stationary lid member supported at the upper end of the vessel, inlet means associated with an opening in the lid for feeding pulverulent material onto interior side wall portions of the vessel, the inlet means including chute means for directing a stream of pulverulent material into the vessel, and adjustable diverting means in the path of the stream for varying the location at which pulverulent material is deposited onto the side wall portions.

2. The apparatus of claim 1 wherein the diverting means are supported within the vessel.

3. The apparatus of claim 2 wherein the diverting means comprise a plate mounted for pivoting about a substantially horizontal axis.

4. The apparatus of claim 6 further comprising actuating means for pivoting the diverting plate from outside the vessel.

5. The apparatus of claim 7 further including means to cool the diverting plate.

6. Method for liquefying pulverulent material comprising: providing a lining of pulverulent material on interior side wall portions of a generally cylindrical vessel so as to present a sloped melting surface, rotating the lining about a central cavity on a substantially vertical axis, feeding additional pulverulent material onto the lining, heating the vessel interior so as to liquefy portions of the pulverulent material, and draining the liquefied material from the vessel, wherein the feeding step includes directing a stream of the pulverulent material into the vessel through an opening in a stationary lid member and deflecting the additional pulverulent material at a variable angle so as to impinge onto the sloped melting surface at a controlled location.

7. The method of claim 6 wherein the sloped melting surface is maintained facing the central cavity, and the pulverulent material being fed is deflected away from the axis of rotation.

8. The method of claim 6 wherein the pulverulent material being fed is fed into the vessel at a first angle and within the vessel deflected to a second angle.

9. The method of claim 6 wherein the location of the melting surface varies, and the deflection of the additional pulverulent material is varied in response thereto so as to impinge the material onto the melting surface.

10. The method of claim 6 wherein the pulverulent material comprises glass batch material.

11. A method of liquefying pulverulent material comprising: depositing pulverulent material through an inlet in a stationary lid member onto a melting surface of a stable pulverulent layer substantially encircling a central cavity in a liquefying chamber, rotating the melting surface about a substantially vertical axis, heating the chamber to liquefy the deposited material, detecting a change in location of the melting surface, and in response to the detection altering the angle at which pulverulent material is directed toward the melting surface.

12. The method of claim 11 wherein pulverulent material is guided into the melting chamber by a stationary chute, and the angle at which the material is directed toward the melting surface is altered by pivoting a deflector plate.

13. The method of claim 11 wherein the pulverulent material is glass batch material.

* * * * *

UNITED STATES PATENT AND TRADEMARK OFFICE
CERTIFICATE OF CORRECTION

PATENT NO. : 4,529,428

DATED : July 16, 1985

INVENTOR(S) : John K. Groetzinger

It is certified that error appears in the above-identified patent and that said Letters Patent is hereby corrected as shown below:

Column 6, line 20, "6" should be --3--.

Column 6, line 23, "7" should be --4--.

Signed and Sealed this

Fifteenth Day of October 1985

[SEAL]

Attest:

Attesting Officer

DONALD J. QUIGG

Commissioner of Patents and Trademarks—Designate